United States Patent
Schaepers et al.

(10) Patent No.: US 11,512,026 B2
(45) Date of Patent: Nov. 29, 2022

(54) USE OF ZINC SALTS IN COMBINATION WITH ALKYL AMINES IN CEMENT-BASED DRY MORTAR MIXTURES

(71) Applicant: Construction Research & Technology GmbH, Trostberg (DE)

(72) Inventors: Yvonne Schaepers, Augsburg (DE); Juergen Bader, Augsburg (DE); Werner Stohr, Augsburg (DE); Stefan Koehler, Augsburg (DE)

(73) Assignee: Construction Research & Technology GmbH, Trostberg (DE)

( * ) Notice: Subject to any disclaimer, the term of this patent is extended or adjusted under 35 U.S.C. 154(b) by 267 days.

(21) Appl. No.: 16/764,384

(22) PCT Filed: Nov. 13, 2018

(86) PCT No.: PCT/EP2018/081014
§ 371 (c)(1),
(2) Date: May 14, 2020

(87) PCT Pub. No.: WO2019/096760
PCT Pub. Date: May 23, 2019

(65) Prior Publication Data
US 2020/0277236 A1 Sep. 3, 2020

(30) Foreign Application Priority Data

Nov. 14, 2017 (EP) .................... 17201670

(51) Int. Cl.
*C04B 40/06* (2006.01)
*C04B 28/04* (2006.01)
*C04B 28/06* (2006.01)
*C04B 28/14* (2006.01)
*C04B 28/28* (2006.01)
*C04B 28/36* (2006.01)

(52) U.S. Cl.
CPC .......... *C04B 40/0608* (2013.01); *C04B 28/04* (2013.01); *C04B 28/06* (2013.01); *C04B 28/14* (2013.01); *C04B 28/28* (2013.01); *C04B 28/36* (2013.01)

(58) Field of Classification Search
CPC ....... C04B 14/06; C04B 18/146; C04B 22/10; C04B 22/142; C04B 22/143; C04B 24/04; C04B 24/121; C04B 24/122; C04B 28/02; C04B 28/04; C04B 28/06; C04B 28/14; C04B 28/28; C04B 28/36; C04B 40/0608; C04B 2103/0057; Y02W 30/91
See application file for complete search history.

(56) References Cited

U.S. PATENT DOCUMENTS

| 6,797,049 | B1 | 9/2004 | Schwetlick |
| 6,926,837 | B2 | 8/2005 | Schwetlick |
| 10,865,145 | B2 * | 12/2020 | Cappellari ............ C04B 40/065 |
| 2004/0245178 | A1 | 12/2004 | Schwetlick |
| 2015/0119490 | A1 | 4/2015 | Krishnan et al. |
| 2017/0002257 | A1 | 1/2017 | Pisklak et al. |

FOREIGN PATENT DOCUMENTS

| CN | 101643334 A | 2/2010 |
| DE | 202004010467 U1 | 9/2004 |
| DE | 102013007937 A1 | 11/2014 |
| WO | 0108753 A1 | 2/2001 |
| WO | 2006056996 A2 | 6/2006 |

OTHER PUBLICATIONS

International Search Report for International Application No. PCT/EP2018/081014 dated Dec. 3, 2018.
Written Opinion for International Application No. PCT/EP2018/081014 dated Dec. 3, 2018.
Thomson Scientific, London GB, Feb. 10, 2010, vol. 2010, Issue 17, AN 2010-C10089.

* cited by examiner

*Primary Examiner* — Anthony J Green
(74) *Attorney, Agent, or Firm* — Curatolo, Sidoti & Trillis Co., LPA; Salvatore A. Sidoti; Brittany L. Kulwicki

(57) ABSTRACT

A binder composition that includes cement, optionally calcium sulfate, at least one zinc salt and at least one alkylamine, and to a dry-mortar mixture that includes said binder composition. The present invention further relates to the use of a composition composed of a zinc salt and an alkylamine for achieving high early strengths in a binder composition.

15 Claims, No Drawings

USE OF ZINC SALTS IN COMBINATION WITH ALKYL AMINES IN CEMENT-BASED DRY MORTAR MIXTURES

CROSS REFERENCE TO RELATED APPLICATIONS

This application is a national stage application of International Application No. PCT/EP2018/081014, filed 13 Nov. 2018, which claims priority from Great Britain Patent Application No. 17201670.1, filed 14 Nov. 2017, both of which applications are incorporated herein by reference in their entireties.

The present invention relates to a binder composition that comprises cement, optionally calcium sulfate, at least one zinc salt and at least one alkylamine, and to a dry-mortar mixture that comprises said binder composition. The present invention further relates to the use of a composition composed of a zinc salt and an alkylamine for achieving high early strengths in a binder composition.

Dry mortar is a building material that consists of binders such as cement or lime and non-reactive fillers such as chalk or quartz sand and hardens after addition of mixing water through chemical reaction of the binders. Mortar is used primarily for building walls, in the erection of buildings, for repairing concrete, for producing and repairing screeds, as a wear layer or leveling layer on concrete floors, and for plastering walls and ceilings.

The hardening of the binder derives from the formation of hydration products that result from the reaction with the mixing water. The main components of cement are calcium silicates or calcium aluminates, the hydrates of which have strength-giving properties. Sulfate carriers are usually added to cement as setting regulator. The hardening and setting of cement gives rise to a stone-like, water-resistant material characterized by high strength.

However, a common problem when using cementitious binders at low temperatures is that they set, solidify, and harden too slowly, with the result that they take longer to reach the required strength or do not reach it at all. Certain types of binder are consequently of very limited utility in the cold months of the year or cannot be used at all.

There is accordingly a need for binder compositions with which high early strengths can be achieved irrespective of the ambient temperature.

It was therefore an object of the present invention to provide a binder composition for achieving high early strengths at high and low temperatures.

This object was achieved by a binder composition comprising cement, optionally calcium sulfate, at least one zinc salt, and at least one alkylamine.

It was surprisingly found here that cementitious binder compositions show very high early strengths when a composition composed of a zinc salt and an alkylamine is added. The high early strengths are achieved here not only at room temperature, but at low temperatures too.

In a preferred embodiment of the present invention, the cement is Portland cement and/or alumina cement.

In a further preferred embodiment of the present invention, the binder composition comprises
i) 0.1% to 99.9% by weight of Portland cement,
ii) 0.1% to 99.9% by weight of alumina cement,
iii) optionally 0.1% to 99.0% by weight of calcium sulfate,
iv) 0.01% to 10.0% by weight of at least one zinc salt, and
v) 0.01% to 10.0% by weight of at least one alkylamine,
based on the total weight of the binder composition.

In another preferred embodiment of the present invention, the at least one zinc salt is selected from the group consisting of zinc oxide, zinc hydroxide, zinc chloride, zinc fluoride, zinc iodide, zinc bromide, zinc phosphate, zinc hydrogen phosphate, zinc dihydrogen phosphate, zinc carbonate, zinc hydrogen carbonate, zinc nitrate, zinc nitrite, zinc sulfate, zinc thiosulfate, zinc hydrogen sulfate, zinc sulfite, zinc sulfide, zinc formate, zinc acetate, zinc gluconate, zinc stearate, zinc tartrate, zinc citrate, and mixtures thereof.

The at least one zinc salt is more preferably zinc citrate and/or zinc sulfate.

In a preferred embodiment of the present invention, the at least one alkylamine is an amino alcohol and/or a salt thereof.

In a further preferred embodiment of the present invention, the at least one alkylamine is selected from the group consisting of tris(hydroxymethylamino)methane, diethanolamine, triethanolamine, triisopropanolamine or salts thereof and mixtures thereof.

In another preferred embodiment of the present invention, the binder composition further comprises up to 10.0% by weight, based on the total weight of the binder composition, of at least one additive, this being at least one representative of the following series: thickeners, water-retention agents, pH modifiers, accelerators, retarders, rheology modifiers, hydrophobizing agents, pigments, organic or inorganic fibers, and mixtures thereof.

In a further preferred embodiment of the present invention, the binder composition further comprises up to 10.0% by weight of at least one surface-active substance, based on the total weight of the binder composition.

The at least one surface-active substance is more preferably selected from the group consisting of air-entraining agents, defoamers, wetting additives, superplasticizers, surfactants, and mixtures thereof.

In a further preferred embodiment of the present invention, the binder composition further comprises up to 50.0% by weight of at least one dispersion powder, based on the total weight of the binder composition.

Dispersion powder in the sense of the invention is preferably understood as meaning powders produced from aqueous polymer dispersions by spray drying that are suitable for the production of dry mortars.

Particular preference is given to using at least one dispersion powder based on polyethylene (PE), polypropylene (PP), polyvinyl chloride (PVC), polyvinyl acetate (PVAc), polyvinyl alcohol (PVOH), polystyrene (PS), polyacrylate (PAc), polybutadienes (BR), vinyl esters, Versatates, and copolymers and/or mixtures thereof.

Alternatively, the undried, aqueous polymer dispersions may also be added during the mixing process at the processing site.

In a further preferred embodiment of the present invention, the binder composition further comprises up to 80.0% by weight of at least one latently hydraulic and/or pozzolanic component, based on the total weight of the binder composition.

The binder composition of the invention more preferably comprises at least one latently hydraulic and/or pozzolanic component selected from the group consisting of natural or thermally activated rock powders, microsilica, metakaolin, aluminosilicates, fly ashes, volcanic ashes, trass, rice-husk ash, activated clay, pozzolans, slag sand, burnt oil shale, and mixtures thereof.

The present invention further relates to an article comprising the binder composition described above.

The article is preferably a dry-mortar mixture.

In a preferred embodiment of the present invention, the article further comprises at least one filler.

In another preferred embodiment of the present invention, the filler is at least one from the following series: chalk, quartz sand, quartz powder, rock powders, lightweight fillers, calcite, dolomite, talc, kaolin, mica, heavy spar, pumice powder, perlite, mineral foam, foam beads, pumice, foam glass, hollow-glass spheres, vermiculite, and calcium silicate hydrate.

The present invention further relates to the use of a composition comprising at least one zinc salt and at least one alkylamine for achieving high early strengths in a binder composition.

The present invention is described in more detail below.

As elucidated above, the binder composition of the invention comprises cement, optionally calcium sulfate, at least one zinc salt, and at least one alkylamine.

In the context of the present invention, the term "binder" refers to inorganic compounds that harden in an aqueous environment (hydraulically) or in the presence of air (non-hydraulically). Hydraulic binders include inter alia cement, hydraulic lime, trass, and pozzolans. Non-hydraulic binders include inter alia gypsum, air-hardening lime, magnesium-based binders, and loam. Mineral binders also include latently hydraulic binders such as microsilica, metakaolin, aluminosilicates, fly ashes, activated clay, pozzolans or mixtures thereof. A latently hydraulic binder becomes hydraulic only in the presence of a basic activator. The alkaline medium for activating the binders typically comprises aqueous solutions of alkali metal carbonates, alkali metal fluorides, alkali metal hydroxides, alkali metal aluminates and/or alkali metal silicates, for example soluble waterglass.

In the context of the present invention, the term "cement" refers to an inorganic, finely milled hydraulic binder. DIN EN 197-1 (11/2011) classifies the different types of cement into the categories CEM I-V. The term "cement" also includes cements according to EN 14216, calcium aluminate cements, calcium sulfoaluminate cements (CSA cements), and mixtures thereof.

CEM I cement, also known as Portland cement, comprises about 70% by weight of CaO and MgO, about 20% by weight of $SiO_2$, about 10% by weight of $Al_2O_3$ and $Fe_2O_3$. This cement is obtained by milling and kilning of limestone, chalk and clay. CEM II cement, also known as Portland composite cement, is Portland cement having a low (about 6% to about 20% by weight) or moderate (about 20% to about 35% by weight) amount of additional components. This cement may further comprise blast-furnace slag, fumed silica (not more than 10% by weight), natural pozzolans, natural calcined pozzolans, fly ash, calcined shale or mixtures thereof. CEM III cement, also known as blast-furnace cement, consists of Portland cement comprising 36% to 85% by weight of slag. CEM IV cement, also known as pozzolan cement, comprises not only Portland cement but also 11% to 65% by weight of mixtures of pozzolans, silicas, and fly ash. CEM V cement, also known as composite cement, comprises not only Portland cement but also 18% to 50% by weight of slag or mixtures of natural pozzolans, calcined pozzolans, and fly ash. The various cement types may additionally comprise 5% by weight of additional inorganic, finely ground mineral compounds.

Calcium aluminate cements comprise minerals of the formula $CaO.Al_2O_3$. They can be obtained by melting calcium oxide (CaO) or limestone ($CaCO_3$) with bauxite or aluminate. Calcium aluminate cements comprise about 20% to 40% by weight of CaO, up to 5% by weight of $SiO_2$, about 40% to 80% by weight of $Al_2O_3$, and up to about 20% by weight of $Fe_2O_3$. Calcium aluminate cements are defined in the standard DIN EN 14647 (01/2006).

Calcium sulfoaluminate cements may be produced from tricalcium aluminate ($3CaO.Al_2O_3$), anhydrite ($CaSO_4$), calcium sulfate hemihydrate ($CaSO_4.0.5H_2O$) and/or gypsum ($CaSO_4.2H_2O$).

One of the principal components of the binder composition of the invention is cement.

The binder composition of the invention preferably comprises 0.1% to 99.9% by weight, more preferably 10.0% to 95.0% by weight, even more preferably 30.0% to 85.0% by weight, particularly preferably 50.0% to 75.0% by weight, of cement, based on the total weight of the binder composition.

Various types of cement known to those skilled in the art are suitable for the binder composition of the invention. In a preferred embodiment of the present invention, the binder composition comprises Portland cement and/or alumina cement.

The binder composition of the invention more preferably comprises Portland cement and/or alumina cement. The binder composition of the invention particularly preferably comprises Portland cement and alumina cement.

In a particularly preferred embodiment of the present invention, the binder composition comprises Portland cement and alumina cement in a weight ratio in the range from 90:10 to 10:90, more preferably 80:20 to 20:80, particularly preferably 70:30 to 30:70.

Additionally or alternatively, the binder composition of the invention comprises 0.1% to 99.9% by weight, more preferably 5.0% to 90.0% by weight, even more preferably 20.0% to 60.0% by weight, particularly preferably 30.0% to 50.0% by weight, of Portland cement and 0.1% to 99.9% by weight, more preferably 5.0% to 90.0% by weight, even more preferably 10.0% to 50.0% by weight, particularly preferably 15.0% to 35.0% by weight, of alumina cement, based on the total weight of the binder composition.

The binder composition of the invention optionally comprises calcium sulfate.

In the context of the present invention, the term calcium sulfate refers to the compounds calcium sulfate dihydrate ($CaSO_4.2H_2O$), calcium sulfate hemihydrate ($CaSO_4.\frac{1}{2}H_2O$), and calcium sulfate anhydrite ($CaSO_4$). Natural gypsum is $CaSO_4.2H_2O$. However, calcined gypsum may exist in a multiplicity of hydration states of the general formula $CaSO_4.nH_2O$, where $0 \leq n < 2$.

In a preferred embodiment of the present invention, the binder composition comprises calcium sulfate.

The binder composition of the invention preferably comprises up to 99.9% by weight, more preferably 0.1% to 99.0% by weight, even more preferably 1.0% to 60.0% by weight, more preferably still 2.0% to 40.0% by weight, particularly preferably 3.0% to 30.0% by weight, for instance 5.0% to 20.0% by weight, of calcium sulfate, based on the total weight of the binder composition.

The binder composition of the invention further comprises at least one zinc salt and at least one alkylamine.

In a preferred embodiment of the present invention, the binder composition comprises the at least one zinc salt and the at least one alkylamine in a weight ratio from 10:90 to 90:10, more preferably from 20:80 to 80:20, particularly preferably from 70:30 to 30:70.

The at least one zinc salt may be a zinc salt, an oxide or hydroxide, or the zinc salt of an inorganic and/or an organic acid.

More preferably, the at least one zinc salt is selected from the group consisting of zinc(II) oxide (ZnO), zinc(II) hydroxide (Zn(OH)$_2$), zinc(II) chloride (ZnCl$_2$), zinc(II) fluoride (ZnF$_2$), zinc iodide (ZnI$_2$), zinc bromide (ZnBr$_2$), zinc phosphate (Zn$_3$(PO$_4$)$_2$), zinc hydrogen phosphate (ZnHPO$_4$), zinc dihydrogen phosphate (Zn(H$_2$PO$_4$)$_2$), zinc (II) carbonate (ZnCO$_3$), zinc hydrogen carbonate (Zn(HCO$_3$)$_2$), zinc(II) nitrate (Zn(NO$_3$)$_2$), zinc(II) nitrite (Zn(NO$_2$)$_2$), zinc(II) sulfate (ZnSO$_4$), zinc(II) thiosulfate (ZnS$_2$O$_3$), zinc(II) hydrogen sulfate (Zn(HSO$_4$)$_2$), zinc(II) sulfite (ZnSO$_3$), zinc(II) sulfide (ZnS), zinc(II) formate (Zn(HOOC)$_2$), zinc(II) acetate (Zn(MeOOC)$_2$), zinc(II) gluconate, zinc(II) stearate, zinc(II) tartrate, trizinc dicitrate, and mixtures thereof.

In a particularly preferred embodiment of the present invention, the at least one zinc salt is zinc citrate and/or zinc sulfate.

In the context of the present invention, zinc gluconate, zinc stearate, zinc tartrate, and zinc citrate are the zinc salts of gluconic acid, stearic acid, tartaric acid, and citric acid. The zinc citrate is preferably trizinc dicitrate.

Accordingly, the at least one zinc salt is particularly preferably trizinc dicitrate and/or zinc(II) sulfate.

The binder composition of the invention preferably comprises 0.01% to 10.0% by weight, more preferably 0.05% to 5.0% by weight, even more preferably 0.05% to 1.0% by weight, particularly preferably 0.1% to 0.5% by weight, of the at least one zinc salt, based on the total weight of the binder composition.

The at least one alkylamine is preferably an alkylamine of the formula (I)

$$NR^1R^2R^3 \qquad (I),$$

where $R^1$, $R^2$, and $R^3$ independently represent hydrogen or unbranched or branched $C_1$ to $C_{20}$ alkyl radicals that are independently unsubstituted or may be substituted with —OH, —NH$_2$, —F, —Cl, —Br, —I, —SO$_3$H and/or —COOH, with the proviso that at least one of $R^1$, $R^2$, and $R^3$ is not hydrogen.

Preferably, $R^1$, $R^2$, and $R^3$ independently represent hydrogen or unbranched or branched $C_1$ to $C_{20}$ alkyl radicals substituted with —OH, with the proviso that at least one of $R^1$, $R^2$, and $R^3$ is not hydrogen.

More preferably, $R^1$, $R^2$, and $R^3$ independently represent hydrogen, —(CH$_2$)$_2$—OH or —C(CH$_2$OH)$_3$, with the proviso that at least one of $R^1$, $R^2$, and $R^3$ is not hydrogen.

Accordingly, the at least one alkylamine is particularly preferably an amino alcohol and/or a salt thereof.

$R^1$, $R^2$, and $R^3$ may be identical or different. $R^1$, $R^2$, and $R^3$ are preferably identical.

In a preferred embodiment of the present invention, the at least one alkylamine is selected from the group consisting of tris(hydroxymethylamino)methane, diethanolamine, triethanolamine, triisopropanolamine or salts thereof and mixtures thereof.

The at least one alkylamine is more preferably triethanolamine and/or tris(hydroxymethyl)aminomethane.

The binder composition of the invention preferably comprises 0.01% to 10.0% by weight, more preferably 0.05% to 5.0% by weight, even more preferably 0.05% to 3.0% by weight, particularly preferably 0.1% to 1.0% by weight, of the at least one alkylamine, based on the total weight of the binder composition.

In a preferred embodiment of the present invention, the binder composition comprises 0.1% to 99.9% by weight, more preferably 10.0% to 95.0% by weight, even more preferably 30.0% to 85.0% by weight, particularly preferably 50.0% to 75.0%, of cement, optionally up to 99.9% by weight, more preferably 0.1% to 99.0% by weight, even more preferably 1.0% to 60.0% by weight, more preferably still 2.0% to 40.0% by weight, particularly preferably 3.0% to 30.0% by weight, for instance 5.0% to 20.0% by weight, of calcium sulfate, 0.01% to 10.0% by weight, more preferably 0.05% to 5.0% by weight, even more preferably 0.05% to 1.0% by weight, particularly preferably 0.1% to 0.5% by weight, of the at least one zinc salt, and 0.01% to 10.0% by weight, more preferably 0.05% to 5.0% by weight, even more preferably 0.05% to 3.0% by weight, particularly preferably 0.1% to 1.0% by weight, of the at least one alkylamine, based on the total weight of the binder composition.

Especially preferably, the binder composition comprises 0.1 to 99.9% by weight, more preferably 5.0 to 90.0% by weight, even more preferably 20.0 to 60.0% by weight, particularly preferably 30.0 to 50.0% by weight, of Portland cement and 0.1 to 99.9% by weight, more preferably 5.0 to 90.0% by weight, even more preferably 10.0 to 50.0% by weight, particularly preferably 15.0 to 35.0% by weight, of alumina cement, optionally up to 99.9% by weight, more preferably 0.1% to 99.0% by weight, even more preferably 1.0% to 60.0% by weight, more preferably still 2.0% to 40.0% by weight, particularly preferably 3.0% to 30.0% by weight, for instance 5.0% to 20.0% by weight, of calcium sulfate, 0.01% to 10.0% by weight, more preferably 0.05% to 5.0% by weight, even more preferably 0.05% to 1.0% by weight, particularly preferably 0.1% to 0.5% by weight, of the at least one zinc salt, and 0.01% to 10.0% by weight, more preferably 0.05% to 5.0% by weight, even more preferably 0.05% to 3.0% by weight, particularly preferably 0.1% to 1.0% by weight, of the at least one alkylamine, based on the total weight of the binder composition.

In another preferred embodiment of the present invention, the binder composition further comprises up to 80.0% by weight, more preferably up to 50% by weight, even more preferably up to 20% by weight, particularly preferably up to 10% by weight, based on the total weight of the binder composition, of at least one additive, this being at least one representative from the following series: latently hydraulic substances, pozzolanic substances, dispersion powders, thickeners, water-retention agents, pH modifiers, accelerators, retarders, rheology modifiers, superplasticizers, surfactants, hydrophobizing agents, pigments, organic or inorganic fibers, and mixtures thereof.

As elucidated above, latently hydraulic and pozzolanic substances are mineral binders that become hydraulic only in the presence of a basic activator. Suitable latently hydraulic and/or pozzolanic components are selected from the group consisting of natural or thermally activated rock powders, microsilica, metakaolin, aluminosilicates, fly ashes, volcanic ashes, trass, rice-husk ash, activated clay, pozzolans, slag sand, burnt oil shale or mixtures thereof.

More preferably, the latently hydraulic and/or pozzolanic component is microsilica.

In a further preferred embodiment of the present invention, the binder composition further comprises up to 50.0% by weight of at least one dispersion powder, based on the total weight of the binder composition.

Especially when using the binder of the invention in cement mortars or gypsum mortars, the addition of dispersion powders results in a distinct improvement in properties. For example, the addition of dispersion powders before setting results in less water being needed and a longer processing time.

Suitable dispersion powders are those based on polyethylene (PE), polypropylene (PP), polyvinyl chloride (PVC), polyvinyl acetate (PVAc), polyvinyl alcohol (PVOH), polystyrene (PS), polyacrylate (PAc), polybutadienes (BR), vinyl esters, Versatates, and copolymers and/or mixtures thereof.

Alternatively, the undried, aqueous polymer dispersions may also be added during the mixing process at the processing site.

Both organic and inorganic thickeners may be used as thickeners for the binder composition of the invention.

Suitable organic thickeners are selected from the group consisting of cellulose ethers, starch ethers and polyacrylamides. In a further embodiment the thickener is selected from polysaccharide derivatives and (co)polymers having a weight-average molecular weight Mw of more than 500 000 g/mol, in particular of more than 1 000 000 g/mol.

In a further embodiment the thickener is selected from cellulose ethers, starch ethers, and (co)polymers comprising structural units of nonionic (meth)acrylamide monomers and/or sulfonic acid monomers and optionally of further monomers. Preference is given to cellulose ethers and starch ethers. Particular preference is given to cellulose ethers.

Suitable cellulose ethers are alkylcelluloses such as methylcellulose, ethylcellulose, propylcellulose and methylethylcellulose; hydroxyalkylcelluloses such as hydroxyethylcellulose (HEC), hydroxypropylcellulose (HPC) and hydroxyethylhydroxypropylcellu lose; alkylhydroxyalkylcelluloses such as methylhydroxyethylcellulose (MHEC), methylhydroxypropylcelluose (MHPC), and propylhydroxypropylcellulose; and carboxylated cellulose ethers such as carboxymethylcellulose (CMC). Preference is given to nonionic cellulose ether derivatives, in particular methylcellulose (MC), hydroxypropylcellulose (HPC), hydroxyethylcellulose (HEC) and ethylhydroxyethylcellulose (EHEC), and particular preference to methylhydroxyethylcellulose (MHEC) and methylhydroxypropylcellulose (MHPC). The cellulose ether derivatives are in each case obtainable by appropriate alkylation and alkoxylation of cellulose and are commercially available.

Suitable starch ethers are nonionic starch ethers such as hydroxypropyl starch, hydroxyethyl starch and methylhydroxypropyl starch. Hydroxypropyl starch is preferred. Other suitable thickeners are microbially produced polysaccharides such as welan gum and/or xanthans and naturally occurring polysaccharides such as alginates, carrageenans, and galactomannans. These may be obtained from corresponding natural products by extractive processes, for example from algae in the case of alginates and carrageenans and from carob kernels in the case of galactomannans.

(Co)polymers having a weight-average molecular weight Mw of more than 500 000 g/mol, more preferably of more than 1 000 000 g/mol, may be produced from nonionic (meth)acrylamide monomers and/or sulfonic acid monomers (preferably by free-radical polymerization). In one embodiment the monomers are selected from acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N, N-dimethylaminopropylacrylamide, N,N-dimethylaminoethylacrylamide and/or N-tert-butylacrylamide and/or styrenesulfonic acid, 2-acrylamido-2-methylpropanesulfonic acid, 2-methacrylamido-2-methylpropanesulfonic acid, 2-acrylamidobutanesulfonic acid and/or 2-acrylamido-2,4,4-trimethylpentanesulfonic acid or the salts of the recited acids. The (co)polymers preferably comprise more than 50 mol % and more preferably more than 70 mol % of structural units derived from nonionic (meth)acrylamide monomers and/or sulfonic acid monomers. Other structural units that may be present in the copolymers are for example derived from the monomers (meth)acrylic acid, esters of (meth)acrylic acids with branched or unbranched $C_1$ to $C_{10}$ alcohols, vinyl acetate, vinyl propionate and/or styrene.

In a further embodiment the thickener is selected from methylcellulose, hydroxypropylcellulose, hydroxyethylcellulose, ethyl hydroxyethylcellulose, hydroxypropyl starch, hydroxyethyl starch, methylhydroxypropyl starch, and (co)polymers comprising structural units derived from acrylamide, methacrylamide, N,N-dimethylacrylamide, 2-acrylamido-2-methylpropanesulfonic acid and optionally (meth)acrylic acid, esters of (meth)acrylic acids with branched or unbranched $C_1$ to $C_{10}$ alcohols, vinyl acetate, vinyl propionate and/or styrene.

Examples of suitable inorganic thickeners are phyllosilicates.

Rheology modifiers adjust the viscosity and thus the flow properties, ensuring a good balance between consistency, durability, and performance properties. These modifiers may be based on synthetic polymers (for example acrylic polymers), cellulose, silicon dioxide, starches or clays.

Superplasticizers are polymers that act as dispersing agents to avoid particle segregation or to improve the rheology and thus the processability of suspensions. Superplasticizers may generally be assigned to the following categories: lignosulfonates, melaminesulfonates, naphthalenesulfonates, comb polymers (for example polycarboxylate ethers, polyaromatic ethers, cationic copolymers, and mixtures thereof), and sulfonated ketone formaldehyde condensates. Preferred superplasticizers are naphthalenesulfonates or polycarboxylate ethers.

The setting time of the binder composition may be prolonged/shortened by the addition of certain compounds known as retarders/accelerators. Retarders may be divided into the groups of lignosulfonates, cellulose derivatives, hydroxycarboxylic acids, organophosphates, synthetic retarders, and inorganic compounds. Nonlimiting examples of retarders are hydroxyethylcellulose, carboxymethyl hydroxyethylcellulose, citric acid, tartaric acid, gluconic acid, glucoheptonate, maleic anhydride, 2-acrylamido-2-methylpropanesulfonic acid (AMPS) copolymers, borax, boric acid, and ZnO. Nonlimiting examples of accelerators are alkali metal carbonates, $CaCl_2$, KCl, $Na_2SiO_3$, NaOH, $Ca(OH)_2$ and $CaO.Al_2O_3$, lithium silicate, potassium silicate, and aluminum salts such as aluminum sulfate.

The accelerator is preferably at least one alkali metal carbonate selected from the group consisting of $Li_2CO_3$, $Na_2CO_3$, $K_2CO_3$, and mixtures thereof. Particular preference is given to $Li_2CO_3$.

The binder composition of the invention preferably comprises up to 10.0% by weight, more preferably up to 5.0% by weight, even more preferably up to 2.0% by weight, particularly preferably up to 1.0% by weight, of at least one retarder and/or accelerator.

According to a preferred embodiment of the present invention, the binder composition comprises up to 10.0% by weight, more preferably up to 5.0% by weight, even more preferably up to 2.0% by weight, particularly preferably up to 1.0% by weight, of at least one accelerator selected from the group consisting of alkali metal carbonates, $CaCl_2$, KCl, $Na_2SiO_3$, NaOH, $Ca(OH)_2$ and $CaO.Al_2O_3$, lithium silicate, potassium silicate, aluminum salts, and mixtures thereof.

The water-retention agent may in particular be methylcellulose and/or a water-soluble or water-swellable copolymer containing sulfo groups. The copolymers containing sulfo groups may be, for example, compounds such as those described in DE 10037629. With regard to the copolymers containing sulfo groups, reference is made to patent applications DE 10037629, WO 2008113460, and WO 2005090424.

Surfactants that may be used in addition to the surface-active substances described herein include nonionic surfactants, anionic surfactants, cationic surfactants, zwitterionic surfactants, and proteins or synthetic polymers.

The term "pH modifier" refers to an alkaline or acidic agent and includes mineral and organic acids and inorganic and organic bases.

Hydrophobizing agents can prevent the absorption of water, for example in the form of water vapor. This allows damage caused by the penetration of water to be prevented or at least reduced. Suitable hydrophobizing agents include silicones, fatty acids, and waxes.

As elucidated above, the binder composition of the invention preferably comprises up to 80.0% by weight, more preferably up to 50% by weight, even more preferably up to 20% by weight, particularly preferably up to 10% by weight, of the at least one additive, based on the total weight of the binder composition.

Accordingly, the binder composition of the invention preferably comprises 0.1 to 99.9% by weight, more preferably 5.0 to 90.0% by weight, even more preferably 20.0 to 60.0% by weight, particularly preferably 30.0 to 50.0% by weight, of Portland cement and 0.1 to 99.9% by weight, more preferably 5.0 to 90.0% by weight, even more preferably 10.0 to 50.0% by weight, particularly preferably 15.0 to 35.0% by weight, of alumina cement, optionally up to 99.9% by weight, more preferably 0.1% to 99.0% by weight, even more preferably 1.0% to 60.0% by weight, more preferably still 2.0% to 40.0% by weight, particularly preferably 3.0% to 30.0% by weight, for example 5.0% to 20.0% by weight, of calcium sulfate, 0.01% to 10.0% by weight, more preferably 0.05% to 5.0% by weight, even more preferably 0.05% to 1.0% by weight, particularly preferably 0.1% to 0.5% by weight, of the at least one zinc salt, 0.01% to 10.0% by weight, more preferably 0.05% to 5.0% by weight, even more preferably 0.05% to 3.0% by weight, particularly preferably 0.1% to 1.0% by weight, of the at least one alkylamine, and up to 80.0% by weight, more preferably up to 50% by weight, even more preferably up to 20% by weight, particularly preferably up to 10% by weight, of the at least one additive, based on the total weight of the binder composition.

The at least one additive is preferably at least one latently hydraulic and/or pozzolanic component. Particular preference is given to microsilica.

Accordingly, the binder composition of the invention preferably comprises 0.1 to 99.9% by weight, more preferably 5.0 to 90.0% by weight, even more preferably 20.0 to 60.0% by weight, particularly preferably 30.0 to 50.0% by weight, of Portland cement and 0.1 to 99.9% by weight, more preferably 5.0 to 90.0% by weight, even more preferably 10.0 to 50.0% by weight, particularly preferably 15.0 to 35.0% by weight, of alumina cement, optionally up to 99.9% by weight, more preferably 0.1% to 99.0% by weight, even more preferably 1.0% to 60.0% by weight, more preferably still 2.0% to 40.0% by weight, particularly preferably 3.0% to 30.0% by weight, for example 5.0% to 20.0% by weight, of calcium sulfate, 0.01% to 10.0% by weight, more preferably 0.05% to 5.0% by weight, even more preferably 0.05% to 1.0% by weight, particularly preferably 0.1% to 0.5% by weight, of the at least one zinc salt, 0.01% to 10.0% by weight, more preferably 0.05% to 5.0% by weight, even more preferably 0.05% to 3.0% by weight, particularly preferably 0.1% to 1.0% by weight, of the at least one alkylamine, and up to 80.0% by weight, more preferably up to 50% by weight, even more preferably up to 20% by weight, particularly preferably up to 10% by weight, of microsilica, based on the total weight of the binder composition.

The binder composition of the invention preferably further comprises at least one accelerator and/or retarder as additive.

Accordingly, the binder composition of the invention preferably comprises 0.1 to 99.9% by weight, more preferably 5.0 to 90.0% by weight, even more preferably 20.0 to 60.0% by weight, particularly preferably 30.0 to 50.0% by weight, of Portland cement and 0.1 to 99.9% by weight, more preferably 5.0 to 90.0% by weight, even more preferably 10.0 to 50.0% by weight, particularly preferably 15.0 to 35.0% by weight, of alumina cement, optionally up to 99.9% by weight, more preferably 0.1% to 99.0% by weight, even more preferably 1.0% to 60.0% by weight, more preferably still 2.0% to 40.0% by weight, particularly preferably 3.0% to 30.0% by weight, for instance 5.0% to 20.0% by weight, of calcium sulfate, 0.01% to 10.0% by weight, more preferably 0.05% to 5.0% by weight, even more preferably 0.05% to 1.0% by weight, particularly preferably 0.1% to 0.5% by weight, of the at least one zinc salt, 0.01% to 10.0% by weight, more preferably 0.05% to 5.0% by weight, even more preferably 0.05% to 3.0% by weight, particularly preferably 0.1% to 1.0% by weight, of the at least one alkylamine, up to 80.0% by weight, more preferably up to 50% by weight, even more preferably up to 20% by weight, particularly preferably up to 10% by weight, of microsilica, and up to 10.0% by weight, more preferably up to 5.0% by weight, even more preferably up to 2.0% by weight, particularly preferably up to 1.0% by weight, of at least one retarder and/or accelerator, based on the total weight of the binder composition.

In a further preferred embodiment of the present invention, the binder composition further comprises up to 10.0% by weight of at least one surface-active substance, based on the total weight of the binder composition.

The at least one surface-active substance is more preferably selected from the group consisting of air-entraining agents, defoamers, wetting additives, and mixtures thereof.

The air-entraining agent used is preferably at least one from the following series: tall resins, balsamic resins, alkyl sulfates and/or salts thereof, ligno sulfonates, gas-forming agents, carboxyl compounds and/or salts thereof, and protein acids, with preference given to sodium lauryl sulfate. Gas-forming agents may be metals, in particular aluminum or zinc, that generate hydrogen, for example in the mixed mortar.

In addition, fibers may be added to the binder composition of the invention, these preferably being at least one from the following series: cellulose fibers, carbon fibers, mineral fibers, and plastic fibers, in particular glass fibers. The addition of fibers is advantageous particularly when using the binder composition of the invention in repair mortars.

The present invention further relates to an article that comprises the binder composition described above.

The article preferably comprises 5.0% to 100.0% by weight, more preferably 15.0% to 85.0% by weight, particularly preferably 25% to 75.0% by weight, of the binder composition of the invention, based on the total weight of the article.

Said article is preferably a dry-mortar mixture.

A large part of the dry-mortar mixture may consist of fillers.

In the context of the present invention, the term "filler" refers to materials that may be added to increase the volume without impairing the properties of the binder composition.

Accordingly, the article of the invention, preferably the dry-mortar mixture of the invention, comprises at least one filler, this being preferably at least one from the following series: chalk, quartz sand, quartz powder, rock powders, lightweight fillers, calcite, dolomite, talc, kaolin, mica, heavy spar, pumice powder, perlite, mineral foam, foam beads, pumice, foam glass, hollow-glass spheres, vermiculite, and calcium silicate hydrate.

The article of the invention, preferably the dry-mortar mixture of the invention, preferably comprises the binder composition of the invention and the at least one filler in a weight ratio from 1:99 to 99:1, more preferably from 15:85 to 85:15, particularly preferably from 25:75 to 75:25.

Accordingly, the article of the invention, preferably the dry-mortar mixture of the invention, comprises preferably 1.0% to 99.0% by weight, more preferably 15.0% to 85.0% by weight, even more preferably 25.0% to 75.0% by weight, particularly preferably 40.0% to 70.0% by weight, of the binder composition of the invention and 1.0% to 99.0% by weight, more preferably 15.0% to 85.0% by weight, even more preferably 25.0% to 75.0% by weight, particularly preferably 30.0% to 50.0% by weight, of fillers, based on the total weight of the article, preferably the dry-mortar mixture.

The fillers are particularly preferably quartz sand.

Accordingly, the article of the invention, preferably the dry-mortar mixture of the invention, comprises preferably 1.0% to 99.0% by weight, more preferably 15.0% to 85.0% by weight, even more preferably 25.0% to 75.0% by weight, particularly preferably 40.0% to 70.0% by weight, of the binder composition of the invention and 1.0% to 99.0% by weight, more preferably 15.0% to 85.0% by weight, even more preferably 25.0% to 75.0% by weight, particularly preferably 30.0% to 50.0% by weight, of quartz sand, based on the total weight of the article, preferably the dry-mortar mixture.

When it is used, the dry-mortar mixture of the invention is made up with water, with preferably 50 to 400 ml, more preferably 100 to 200 ml, particularly preferably 120 to 150 ml, of water being used per kilogram of dry mortar. The water is added in a plastering machine or in a container, which is vigorously stirred using suitable stirring devices, for example a basket stirrer that can be connected to a slow-running drill (approx. 400 revolutions/min).

The present invention further relates to the use of a composition comprising at least one zinc salt and at least one alkylamine for achieving high early strengths in a binder composition.

The at least one zinc salt and the at least one alkylamine are preferably the zinc salts and alkylamines described above.

The examples that follow are intended to elucidate the invention in more detail.

EXAMPLES

Dry Mortar 1 (Reference)
25.0% by weight Portland cement
15.0% by weight alumina cement
10.0% by weight calcium sulfate
5.0% by weight microsilica
44.6% by weight quartz sand
0.2% by weight lithium carbonate
0.2% by weight tartaric acid
Mixing water: 150 g/kg Dry Mortar 2 (Inventive)
25.0% by weight Portland cement
15.0% by weight alumina cement
10.0% by weight calcium sulfate
5.0% by weight microsilica
44.4% by weight quartz sand
0.2% by weight lithium carbonate
0.2% by weight zinc citrate
0.2% by weight tris(hydroxymethyl)aminomethane
Mixing water: 150 g/kg Dry Mortar 3 (Inventve)
25.0% by weight Portland cement
15.0% by weight alumina cement
10.0% by weight calcium sulfate
5.0% by weight microsilica
44.0% by weight quartz sand
0.2% by weight lithium carbonate
0.2% by weight zinc sulfate
0.5% by weight triethanolamine
0.1% by weight citric acid
Mixing water: 140 g/kg Dry Mortar 4 (Reference)
25.0% by weight Portland cement
15.0% by weight alumina cement
10.0% by weight calcium sulfate
5.0% by weight microsilica
44.6% by weight quartz sand
0.2% by weight lithium carbonate
0.2% by weight zinc citrate
Mixing water: 150 g/kg Dry Mortar 5 (Reference)
24.9% by weight Portland cement
14.9% by weight alumina cement
9.9% by weight calcium sulfate
5.0% by weight microsilica
44.4% by weight quartz sand
0.2% by weight lithium carbonate
0.2% by weight zinc citrate
0.5% by weight ethylene glycol
Mixing water: 150 g/kg Dry Mortar 6 (Reference)
24.9% by weight Portland cement
15.0% by weight alumina cement
10.0% by weight calcium sulfate
5.0% by weight microsilica
44.5% by weight quartz sand
0.2% by weight lithium carbonate
0.2% by weight tris(hydroxymethyl)aminomethane
0.2% by weight tartaric acid
Mixing water: 150 g/kg Test specimens were produced from the resulting fresh masses (160 mm×40 mm×40 mm) and used to determine the compressive strength in accordance with DIN EN 12190. The results are summarized in tables 1 to 6.

TABLE 1

| Compressive strengths with dry mortar 1 (reference) | | | | |
|---|---|---|---|---|
| Test temperature | [° C.] | 23 | 5 | −5 |
| Compressive strength after 1 h | [N/mm$^2$] | 18.5 | too soft | too soft |
| after 2 h | [N/mm$^2$] | 27.6 | too soft | too soft |
| after 4 h | [N/mm$^2$] | 40.3 | 6.8 | too soft |
| after 24 h | [N/mm$^2$] | 43.9 | 38.5 | too soft |

TABLE 2

Compressive strengths with dry mortar 2 (inventive)

| Test temperature | [° C.] | 23 | 5 | −5 |
|---|---|---|---|---|
| Compressive strength after 1 h | [N/mm²] | 22.2 | 12.7 | too soft |
| after 2 h | [N/mm²] | 39.8 | 28.1 | 3.6 |
| after 4 h | [N/mm²] | 42.3 | 34.9 | 13.8 |
| after 24 h | [N/mm²] | 44.9 | 48.7 | 39.3 |

TABLE 3

Compressive strengths with dry mortar 3 (inventive)

| Test temperature | [° C.] | 23 | 5 | −5 |
|---|---|---|---|---|
| Compressive strength after 1 h | [N/mm²] | 20.3 | 8.3 | too soft |
| after 2 h | [N/mm²] | 35.8 | 24.7 | too soft |
| after 4 h | [N/mm²] | 39.9 | 29.9 | 9.8 |
| after 24 h | [N/mm²] | 46.1 | 50.0 | 30.1 |

TABLE 4

Compressive strengths with dry mortar 4 (reference)

| Test temperature | [° C.] | 23 | 5 | −5 |
|---|---|---|---|---|
| Compressive strength after 1 h | [N/mm²] | — | 1.2 | — |
| after 2 h | [N/mm²] | — | 8.6 | — |
| after 4 h | [N/mm²] | — | 20.1 | — |
| after 24 h | [N/mm²] | — | 51.1 | — |

TABLE 5

Compressive strengths with dry mortar 5 (reference)

| Test temperature | [° C.] | 23 | 5 | −5 |
|---|---|---|---|---|
| Compressive strength after 1 h | [N/mm²] | 18.7 | too soft | — |
| after 2 h | [N/mm²] | 29.6 | too soft | — |
| after 4 h | [N/mm²] | 45.2 | 18.6 | — |
| after 24 h | [N/mm²] | 48.9 | 42.0 | — |

TABLE 6

Compressive strengths with dry mortar 6 (reference)

| Test temperature | [° C.] | 23 | 5 | −5 |
|---|---|---|---|---|
| Compressive strength after 1 h | [N/mm²] | 9.6 | too soft | — |
| after 2 h | [N/mm²] | 20.1 | too soft | — |
| after 4 h | [N/mm²] | 31.1 | 6.5 | — |
| after 24 h | [N/mm²] | 45.8 | 41.2 | — |

The results show that the dry-mortar mixtures of the invention, which comprise both a zinc salt and an alkylamine as additives, have high early strengths at room temperature and at lower temperatures, whereas the reference mixture does not harden adequately, particularly at low temperatures.

The invention claimed is:

1. A binder composition comprising
   i) 0.1% A to 99.9% by weight of Portland cement,
   ii) 0.1% to 99.9% by weight of alumina cement,
   iii) optionally 0.1% to 99.0% by weight of calcium sulfate,
   iv) 0.01% to 10.0% by weight of at least one zinc salt, and
   v) 0.01% to 10.0% by weight of at least one alkylamine, based on the total weight of the binder composition.

2. The binder composition according to claim 1, wherein the at least one zinc salt is selected from the group consisting of zinc oxide, zinc hydroxide, zinc chloride, zinc iodide, zinc bromide, zinc phosphate, zinc hydrogen phosphate, zinc dihydrogen phosphate, zinc carbonate, zinc hydrogen carbonate, zinc nitrate, zinc nitrite, zinc sulfate, zinc thiosulfate, zinc hydrogen sulfate, zinc sulfite, zinc sulfide, zinc formate, zinc acetate, zinc gluconate, zinc stearate, zinc tartrate, zinc citrate, and mixtures thereof.

3. The binder composition according to claim 2, wherein the at least one zinc salt is zinc citrate and/or zinc sulfate.

4. The binder composition according to claim 1 wherein the at least one alkylamine is an amino alcohol and/or a salt thereof.

5. The binder composition according to claim 4, wherein the amino alcohol is selected from the group consisting of tris(hydroxymethylamino)methane, diethanolamine, triethanolamine, triisopropanolamine or salts thereof and mixtures thereof.

6. The binder composition according to claim 1 further comprising up to 10.0% by weight, based on the total weight of the binder composition, of at least one additive selected from the group consisting of thickeners, water-retention agents, pH modifiers, accelerators, retarders, rheology modifiers, hydrophobizing agents, pigments, organic or inorganic fibers, and mixtures thereof.

7. The binder composition according to claim 1 further comprising up to 10.0% by weight of at least one surface-active substance, based on the total weight of the binder composition.

8. The binder composition according to claim 7, wherein the at least one surface-active substance is selected from the group consisting of air-entraining agents, defoamers, wetting additives, superplasticizers, surfactants, and mixtures thereof.

9. The binder composition according to claim 1 further comprising at least one dispersion powder selected from the group consisting of polyethylene (PE), polypropylene (PP), polyvinyl chloride (PVC), polyvinyl acetate (PVAc), polyvinyl alcohol (PVOH), polystyrene (PS), polyacrylate (PAc), polybutadienes (BR), vinyl esters, Versatates, and copolymers and/or mixtures thereof.

10. The binder composition according to claim 1 further comprising at least one latently hydraulic and/or pozzolanic component selected from the group consisting of natural or thermally activated rock powders, microsilica, metakaolin, aluminosilicates, fly ashes, volcanic ashes, trass, rice-husk ash, activated clay, pozzolans, slag sand, burnt oil shale, and mixtures thereof.

11. An article comprising the binder composition according to claim 1.

12. The article according to claim 11, wherein the article is a dry-mortar mixture.

13. The article according to claim 11, further comprising at least one filler.

14. The article according to claim 13, wherein the filler is at least one from the following series: chalk, quartz sand, quartz powder, rock powders, lightweight fillers, calcite, dolomite, talc, kaolin, mica, heavy spar, pumice powder, perlite, mineral foam, foam beads, pumice, foam glass, hollow-glass spheres, vermiculite, and calcium silicate hydrate.

15. A method of achieving high early strengths in a binder composition, the method comprising adding 0.01% to 10.0% by weight of at least one zinc salt and 0.01% to 10.0% by weight of at least one alkylamine to a hardenable binder composition comprising components i), ii), and iii) according to claim 1.

* * * * *

UNITED STATES PATENT AND TRADEMARK OFFICE
CERTIFICATE OF CORRECTION

| | | |
|---|---|---|
| PATENT NO. | : 11,512,026 B2 | Page 1 of 1 |
| APPLICATION NO. | : 16/764384 | |
| DATED | : November 29, 2022 | |
| INVENTOR(S) | : Yvonne Schaepers et al. | |

It is certified that error appears in the above-identified patent and that said Letters Patent is hereby corrected as shown below:

In the Claims

Column 13, Line 66, change:
"i) 0.1° A to 99.9% by weight of Portland cement,"
To:
-- i) 0.1% to 99.9% by weight of Portland cement, --

Signed and Sealed this
Seventh Day of January, 2025

Derrick Brent
*Acting Director of the United States Patent and Trademark Office*